Aug. 1, 1950            S. A. STOLBERG            2,517,050
REPEAT DEVICE FOR AUTOMATIC PHONOGRAPHS
Filed Feb. 5, 1945            6 Sheets-Sheet 1

Inventor:
Sven A. Stolberg,

Aug. 1, 1950　　　　S. A. STOLBERG　　　　2,517,050
REPEAT DEVICE FOR AUTOMATIC PHONOGRAPHS
Filed Feb. 5, 1945　　　　　　　　　　　　　　6 Sheets-Sheet 2

Inventor:
Sven A. Stolberg,
Atty.

Aug. 1, 1950          S. A. STOLBERG          2,517,050
REPEAT DEVICE FOR AUTOMATIC PHONOGRAPHS
Filed Feb. 5, 1945                                          6 Sheets-Sheet 4
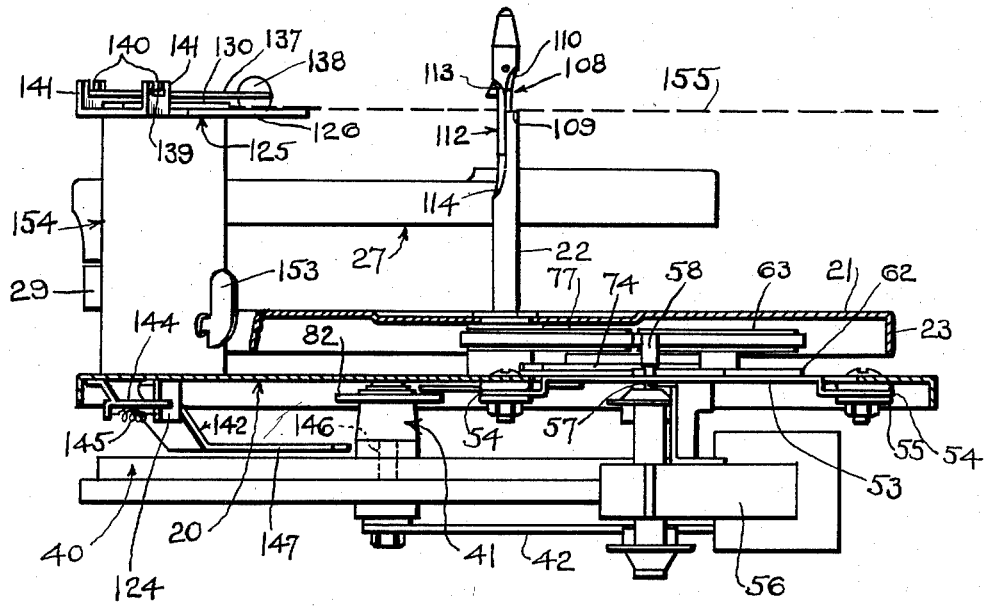
Fig. 4.
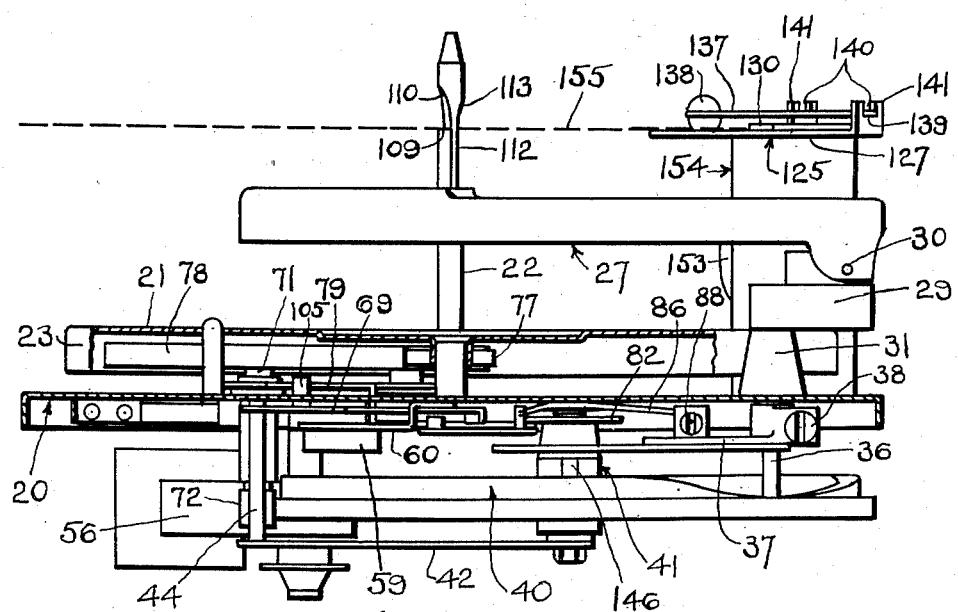
Fig. 5.
Inventor:
Sven A. Stolberg,
by
Atty.

Aug. 1, 1950     S. A. STOLBERG     2,517,050
REPEAT DEVICE FOR AUTOMATIC PHONOGRAPHS
Filed Feb. 5, 1945                6 Sheets-Sheet 5
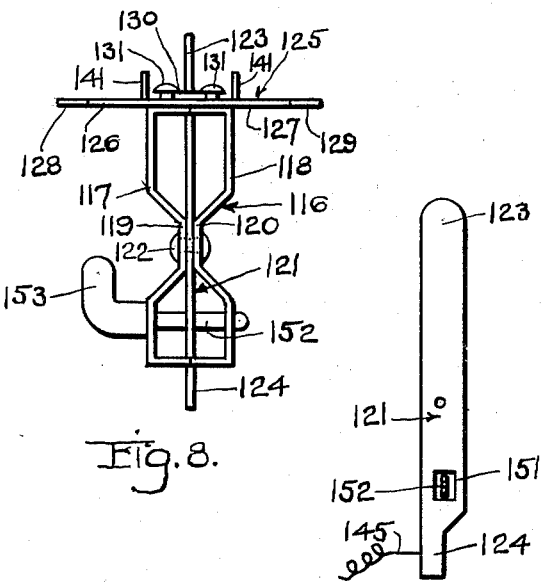
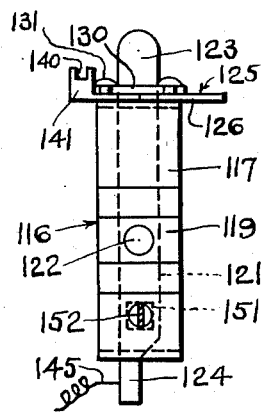
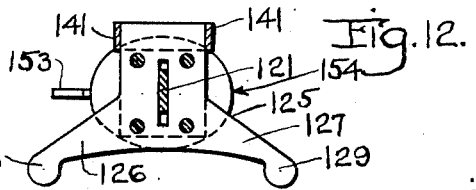
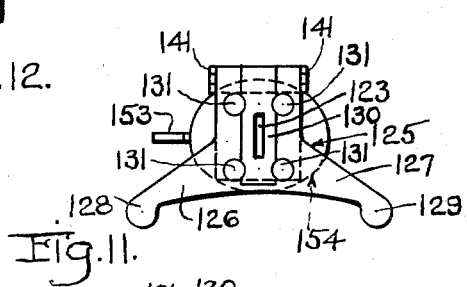
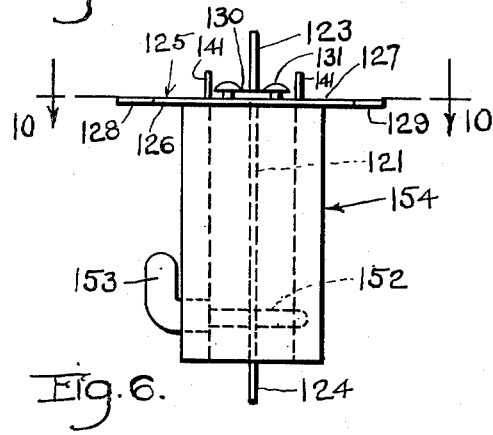
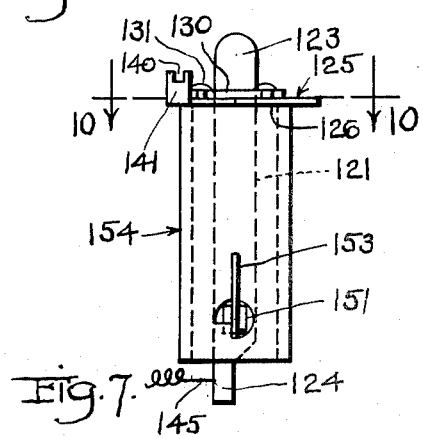
Inventor:
Sven A. Stolberg,

Aug. 1, 1950 S. A. STOLBERG 2,517,050
REPEAT DEVICE FOR AUTOMATIC PHONOGRAPHS
Filed Feb. 5, 1945 6 Sheets-Sheet 6
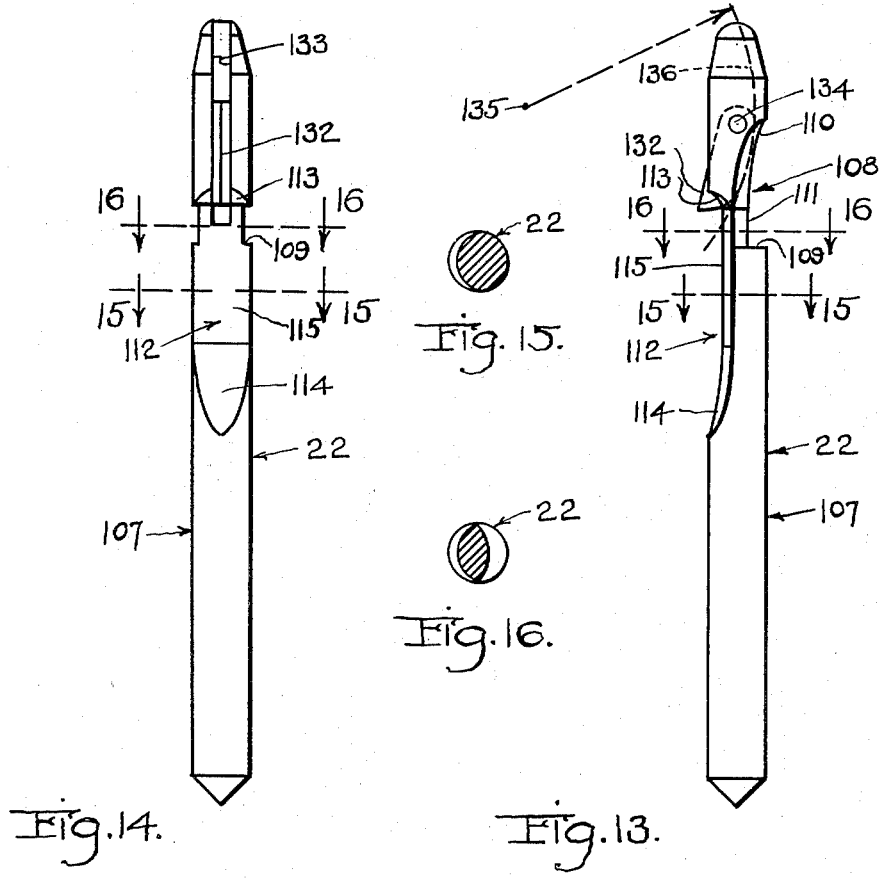
Inventor:
Sven A. Stolberg,
by Thos. A. Banning Jr.
Atty.

Patented Aug. 1, 1950

2,517,050

UNITED STATES PATENT OFFICE 2,517,050

REPEAT DEVICE FOR AUTOMATIC PHONOGRAPHS

Sven A. Stolberg, Chicago, Ill., assignor, by mesne assignments, to Raytheon Manufacturing Company, Newton, Mass., a corporation of Delaware Application February 5, 1945, Serial No. 576,202

3 Claims. (Cl. 274—10)

The present invention relates to record-changing phonographs, and the like. Generally speaking, the record-changer construction herein disclosed is of that type in which a group of records is stacked on a shoulder provided on the center pin of the turntable, with means to shift the bottom record laterally a slight amount to release the same onto the turntable for playing. One feature of the present invention relates to improvements in the means for effecting such lateral shifting of said bottom record for the record changing operation.

In connection with the foregoing, the present invention provides means to permit or effect "repeating" of a record in place on the turntable. A feature of the present invention relates to an improved record shifting means wherein the actual shifting of the record is effected by spring tension when a suitable stop element is released to permit such shift to occur; and it is an object of the invention to provide for repeating a record already in place on the turntable by blocking the lateral movement of the record engaging element so that such lateral shift may not occur under impulse of such spring, even when the release device functions.

A further feature of this record changing device relates to the construction of the edge support for the record itself, and the construction of the lateral shifting device by which the record is shifted. This feature also relates to the construction of the record supporting and shifting unit; and it is an object of the invention to provide a very simple construction of these parts, and one which will be very effective and certain in operation, as well as being of simple form and readily made by simple manufacturing operations.

A further feature of the present invention relates to the manner of operation of the lateral shifting device in proper timing with respect to other operations during the cycle of operations after completion of a playing of a record. In this connection it is an object to effect such lateral shift in a simple manner, and under actuation of the cam element which controls the tone-arm movements.

A further feature of the present invention relates to the driving mechanism whereby the turntable and cam elements are driven by the driving motor, and to the trip-off mechanism whereby the movement of the tone-arm to its extreme inward position serves to effect start of the cam movement, which will then be carried through to its completion. In this connection it is an object of the invention to provide very simple means for positively starting the cam drive when the trip-off operates, and means to positively actuate the trip-off itself without the use of complex or uncertain devices. In this connection it is also an object to provide such trip-off device which will positively operate at the completion of playing records of either the "eccentric" or "spiral" groove terminal types.

A further feature of the invention relates to improvements in the driving means whereby the driving motor serves both the turntable and the one-cycle cam. In this connection it is an object to provide a very simple construction which, additionally, will ensure good contacts between those driving wheels which serve to effect drive by frictional engagements. It is also an object to provide a very direct connection between the release pin and the friction wheel shifting arm, so that operations of said arm under control of said release pin will be very directly secured, and at the most advantageous angles of force application.

In connection with this driving means it is a further object of the invention to provide control means whereby several distinct schemes of operation may be secured, and whereby several certain positions of the control lever may be selected. These include an "Off" position in which the friction wheels are shifted completely from driving engagement with the motor pinion or pulley and turntable, and in which the current supply to the motor is cut off; a "Manual" position in which current supply to the motor is ensured, and in which driving is effected between the motor pinion or pulley and turntable and the friction wheel train, but in which release of the release pin from the clutch is not followed by engagement of the friction drive to the one-cycle cam, so that the automatic movements are not effected; an "Automatic" position in which the various operations are effected automatically in normal manner; and a "Reject" position in which the record changing operations are performed without completion of the record-playing, said "Reject" position being one in which the control means tends to return of itself directly to the "Automatic" position.

Other objects and uses of the present invention will be apparent from a detailed description of the same, which consists in the features of construction and combinations of parts hereinafter described and claimed.

In the drawings:

Figure 4 shows a vertical transverse section taken on the line 4—4 of Figures 1 and 2, looking in the direction of the arrows;

Figure 5 shows a vertical transverse section taken on the line 5—5 of Figures 1 and 2, looking in the direction of the arrows;

Figure 6 shows a side elevation of the record-changing unit assembly;

Figure 7 shows a view of the record-changing assembly at right angles to the view of Figure 6;

Figure 8 shows a view similar to that of Figure 6, but with the housing removed;

Figure 9 shows a view similar to that of Figure 7, but with the housing removed;

Figure 10 shows a plan view on the lines 10—10 of Figures 6 and 7, looking in the directions of the arrows;

Figure 11 shows a plan view corresponding to Figures 6 and 7;

Figure 12 shows a face view of the rock-arm of the record-changer unit;

Figure 13 shows an elevation of the centering pin, on enlarged scale, looking at said pin at right angles to the direction of record shift;

Figure 14 shows a view of the centering pin at right-angles to Figure 13;

Figure 15 shows a horizontal section on the line 15—15 of Figures 13 and 14; and Figure 16 shows a horizontal section on the line 16—16 of Figures 13 and 14.

Figure 1:
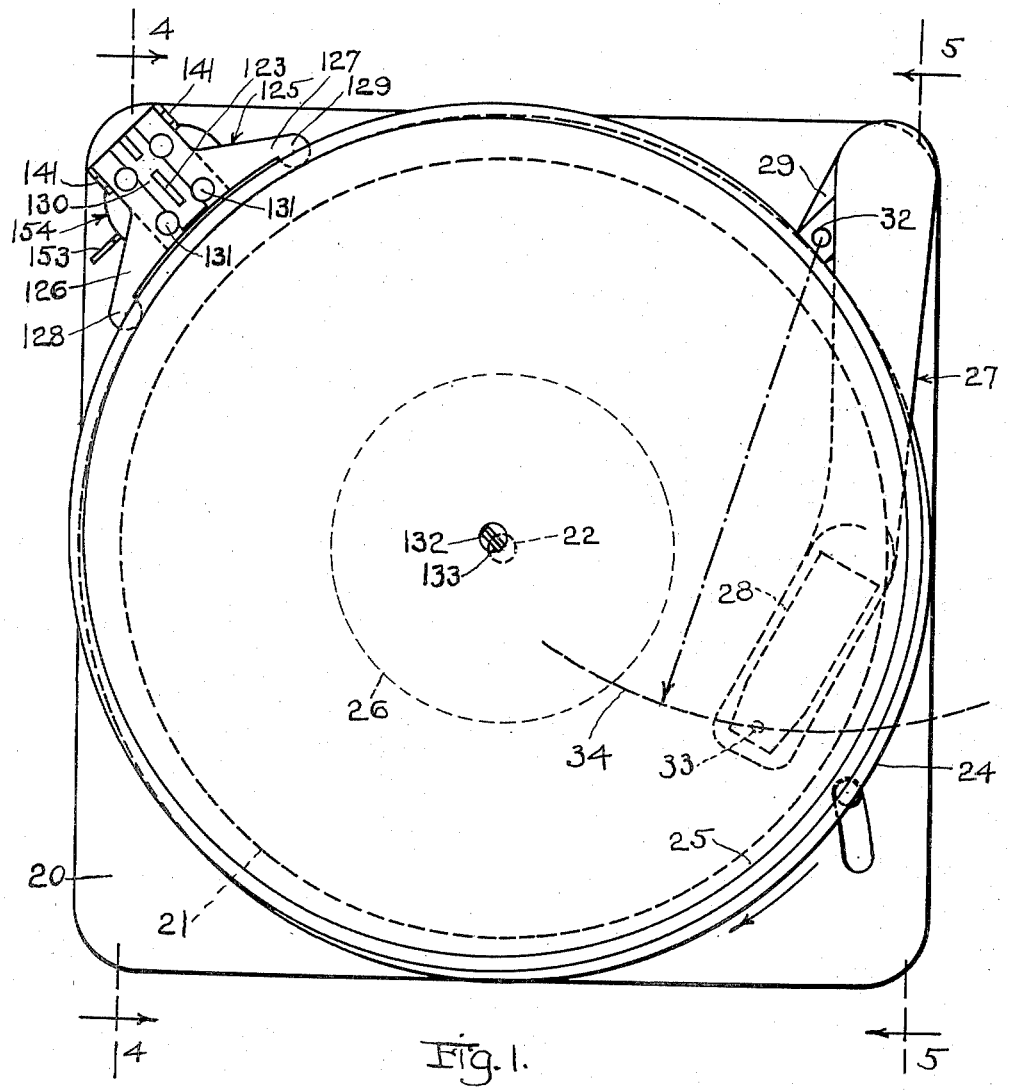
Figure 1 shows a plan view of a typical record-changing phonograph of the center post record support type with a stack of records supported on the center post embodying the features of the present invention.

Referring first to Figure 1, I have therein shown the features of the present invention as incorporated in a record-changer including the table 20, above which is located the usual turntable 21, said turntable being suitably journalled to the turntable by a journal of which the details are not shown herein. However, this journal is such that the centering pin 22 may be held centrally of the turntable, and may either be secured in place or removable as desired. The turntable is provided with the usual edge flange 23 as shown.

In Fig. 1 I have shown a record 24 in place on the turntable, provided with the outer and inner extreme convolutions of the sound track, 25 and 26 respectively. I have shown a tone-arm 27 provided with the pick-up 28, of suitable form; and, as shown in Fig. 5 of the drawings this tone-arm is carried directly by the block 29 on a transverse journal 30 so that the tone-arm can be raised and lowered the necessary extent. This block 29 is itself journalled on the vertical stand 31 for rocking movement about the vertical axis 32, which axis is off-set from the inner end of the tone-arm proper. With this arrangement it will be seen that the stylus or needle 33 will travel on the circular arc 34 drawn about the center 32 in Fig. 1 of the drawings. I have not herein disclosed the details of this tone-arm mounting as they form no part of the present invention.

The tone-arm journal movable about the vertical axis 32 includes the vertical tubular section 35 (see Figs. 2 and 3) extending below the table 20; and a vertically movable rod 36 positioned within said tube 35, which rod 36 reaches to a position slightly lower than the lower end of said tube. A control arm 37 beneath the table 20 has its end split to receive the lower end of said tube 35, and is clamped thereto in any suitable manner, as by the screw 38. This control arm carries the cam-follower pin 39 at its free end, which pin engages the control cam, as will presently appear.

Beneath the table 20 is journalled the cam element 40, the journal stud 41 extending down from the table for this purpose. A triangular plate 42 is secured to this stud beneath the cam element 40, and the pins 43 and 44 extend down from the table to the other corners of this plate to give same additional support. The cam element 40 has the cam slot 45 extending around in circular fashion from the point 46 to the point 47; and in advance of the point 46 the inner wall of this slot extends inwardly to a point 48 close to the center of cam rotation, so that the first cam movement serves to shift the cam follower 39 outwardly to its extreme position, where it is held until the point 47 of the cam comes around. From the point 47 the cam slot swings inwardly to the reduced radius position 49, after which point 49 this cam slot continues on the curved portion 50 formed as a circular arc around the axis of cam rotation, to the terminal point 51. By this means the cam follower is first shifted outwardly to its extreme position, then is held in that position for a substantial portion of the cam rotation, then is shifted inwardly a slight amount, where it is held under control for a short interval of cam rotation; after which the final open end of the cam slot is reached and the cam follower pin is completely released from further control. There is provided a wall 52 in the cam element extending from the terminal end of the cam slot 51 to connection with the beginning end 48 of the cam wall; this wall 52 being formed on a circular arc around the axis 36, so that the cam follower 39 may freely swing back and forth the full necessary extent, but at the same time said pin 36 cannot move to a position behind the cam portions 49 and 50, that is, within said portions measured radially of the cam element itself.

Figure 2:
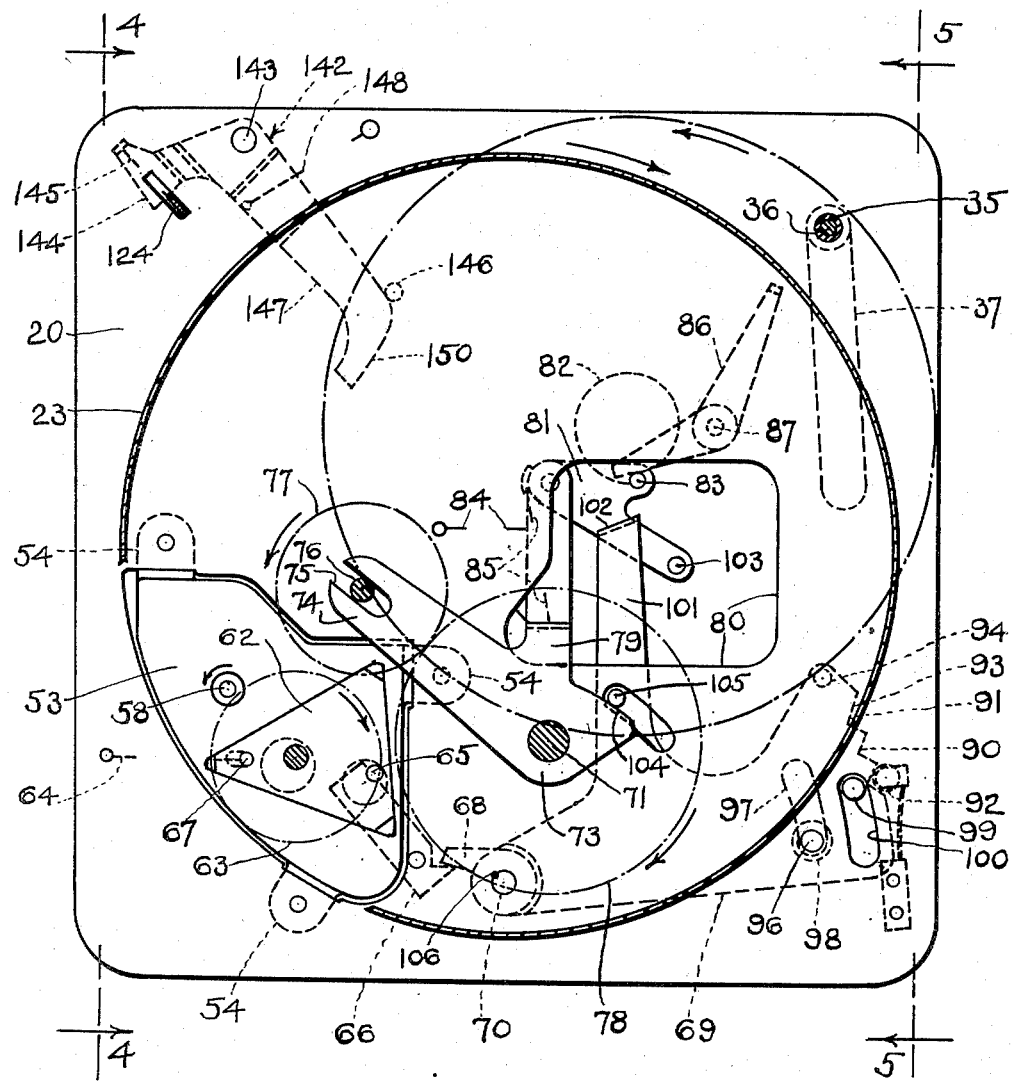
Figure 2 shows a plan view taken at a point just below the level of the top of the turntable actually cutting through the rim thereof.

Referring to Figs. 2, 4 and 5, the driving motor is shown as carried by a somewhat triangular plate 53 which is mounted at the level of the table 20; and for this mounting the table is provided with a corresponding opening, the plate 53 being provided with three lugs 54 which reach downwards and laterally, and are secured to the table by means of vibration absorbing gaskets or thimbles 55 of well understood form, and preferably made of rubber. The motor itself is shown at 56. It has a vertical shaft 57 carrying the small driving pinion or pulley 58 at its upper end. This motor may be controlled by the switch 59 carried by the bracket 60 secured to the bottom face of the table 20, said switch having the finger 61 which when thrown to one side or the other serves to either open or close the motor circuit in well understood manner.

Slidably mounted on the top face of the table is the triangular plate 62 which carries the friction wheel 63 at a level such that said friction wheel may be engaged with both the motor pinion or pulley 58 and the inside face of the turntable flange 23. A spring 64 tends to draw this plate and wheel laterally to ensure such driving engagement; but said plate carries a pin 65 which extends down through an opening of the table 20 to a position beneath said table where said pin may be engaged by a control finger 66. The spring 64 is also located beneath the table and is connected to the plate 62 by a pin 67 which extends through an opening of the table 20 provided for that purpose.

Figure 3:
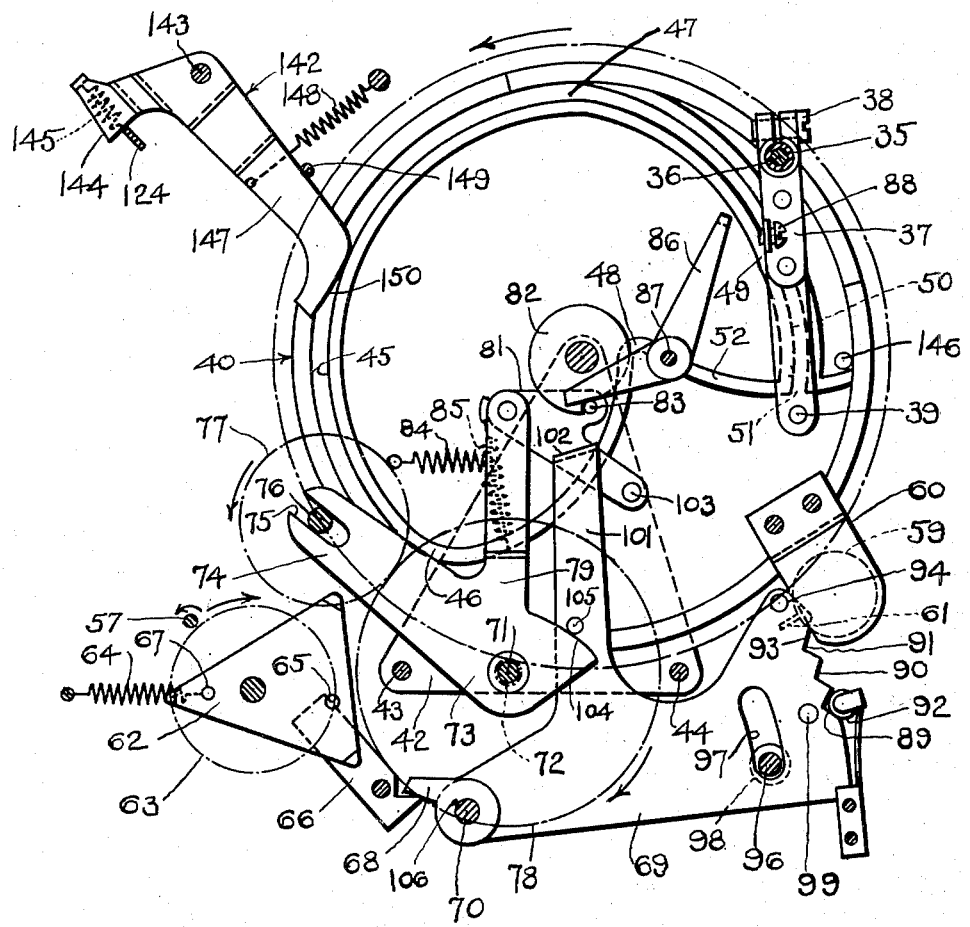
Figure 3 shows a plan view of the principal operating parts taken just below the main supporting table and including certain parts shown in phantom to aid in understanding the operation of the device embodying the present invention.

Rotation of the motor shaft, friction wheel, and turntable is in the directions shown by the respective arrows in Fig. 3. The force of the spring 64 is made great enough to ensure desired driving engagement at all proper times; and in order to further ensure proper driving engagement it will sometimes be desirable to provide the wheel 63 with a rubber facing to engage both the motor pinion or pulley and the turntable flange. Such arrangement is shown herein.

The finger 66 is pivoted to the table 20 so that when it is rocked clockwise it serves to shift the plate 62 towards the right. Such rocking is effected by a finger 68 of the control or selector plate 69, presently to be described, said selector plate being also pivoted to the table 20 at the point 70. Normally this finger 68 does not engage the finger 66, but allows the motor pulley to effect turntable drive; but when the selector plate is shifted to an extreme or "Off" position the finger is thus engaged, and the friction wheel 63 is withdrawn from both the motor pinion and the turntable flange. That action also takes place concurrently with cutting off the motor current supply, as will presently appear.

The cam element 40 is provided with a toothed flange or gear around its lower edge. This gear is not mutilated as has heretofore frequently been necessary, but is continuous throughout its entire periphery. There is a pinion shaft 71 journalled with respect to the table 20, and carrying a pinion 72 on its lower end which meshes continuously with said cam gear. Thus a driving connection is effected between these parts at all times.

In order to rotate the pinion shaft for driving the cam element through one cycle, there is provided the following:

A bell-crank 73 is swingingly mounted on the axis of the pinion shaft 71 so that it can swing through a relatively small angle; and one arm 74 of this bell-crank is slotted as shown at 75 to receive the stud 76 whereon a friction idler wheel 77 is journalled. This stud 76 can be set back and forth in said slot and secured at the so set position to retain the wheel journal at a fixed position on the arm 74. Another friction wheel 78 is secured to the pinion shaft 71 at the plane of the friction wheel 77, and the stud 76 which carries the wheel 77 is so adjusted that a desired degree of frictional engagement is effected between the wheels 77 and 78 to ensure proper transmission of the needed driving force to the cam gear during cam rotation for the one-cycle movement. In this connection it is noted that since the arm 74 swings on the same center as the axis of the wheel 78, there is no interference with such adjustment by such swinging action. In other words, the pressure between the wheels 78 and 77 remains at the adjusted amount, notwithstanding the swinging movements of the bell-crank 73.

The other arm 79 of the bell-crank is formed so that said arm reaches down from a position above the table 20, through an opening 80 of said table, to a position beneath said table. The end of this arm 79 reaches to a position close to the journal or shaft stud 41 whereon the cam element is journalled; and a clutch bell-crank 81 is pivoted to this end of the arm 79. The cam element carries a clutch element 82 having a cam edge, and also having a shoulder; and a pin 83 on the bell-crank 81 is engaged by said shoulder at the completion of the one-cycle rotation of the cam element. Such engagement serves to draw the bell-crank 73 and its arm 79 towards the right, thereby rocking the bell-crank, and drawing the friction idler wheel 77 away from the friction wheel 63. This serves to discontinue driving of the pinion shaft and the cam-element comes to rest at completion of the cycle, and with the cam-follower pin 39 released from the cam slot as shown in Fig. 3 of the drawings. A spring 84 tends to draw the bell-crank 73 counter-clockwise to engage the wheel 77 with the wheel 63 to effect drive to the cam-element; but the shoulder of the clutch element 82 effects disengagement as already explained. Furthermore, a spring 85 tends to draw the clutch bell-crank 81 counter-clockwise to ensure engagement of the pin 83 with the shoulder. Manifestly, upon rocking the clutch bell-crank 81 slightly clockwise, the pin 83 is disengaged from the shoulder, allowing the bell-crank 73 to rock under influence of the spring 84, and effect driving engagement between the wheels.

To engage the wheel 77 with the wheel 63 it is merely necessary to force the bell-crank 81 slightly against the spring 85. Thereupon the driving of the cam element 40 will commence, carrying the clutch element 82 around and carrying its shoulder past the position of the pin 83. Said pin may then be released, permitting the clutch bell-crank 81 to rock back until the pin engages the edge of the clutch element 82, which edge it will engage until the shoulder comes around just prior to completion of the cycle. Thereupon, further rotation of the cam element 40 and clutch element 82 will cause the shoulder to draw the clutch bell-crank 81 slightly towards the right, with consequent disengagement of the wheel 77 from the wheel 63, allowing the cam element 40 to come to rest.

The tripping of the pin 83 is effected by movement of the tone-arm lever 37 to its extreme inward zone at completion of the playing of the record. For this purpose I have provided the lever 86, pivoted to the table 20 at the point 87; the inner end of said lever being so located as to engage the pin 83 to release the same for commencement of the cycle; and the outer end of said lever being located adjacent to the tone-arm lever 37. A pin or screw 88 carried by the tone-arm lever 37 will engage said outer arm of the lever 86 to effect release at the proper time; and said pin or screw may be adjustable, as shown.

I have provided means whereby the operation of the foregoing instrumentalities may be controlled for several conditions. Said means takes the form of the plate 69. Said plate is conveniently provided with the notches 89, 90 and 91 which may be engaged by the spring pressed roller 92 to retain the plate 69 in a selected setting; and there is also a slanting portion of the plate 69, at 93, which may engage the roller in case of an extreme amount of rock of said plate, but the roller will return the plate from this extreme position when the plate is released to the position of the notch 91. Said plate has the pin 94 in position to engage the operating finger 61 of a control switch 59, so that as soon as the plate is rocked from the position shown in Figs. 2 and 3 (the "Off" position), in a clockwise direction, the switch will be closed, supplying current to the motor; and likewise, when the plate is moved to the position shown in said figures, the switch will be opened. Said switch is conveniently carried by a bracket 60 secured to the table 20.

If desired, a stud 96 secured to the table 20 may extend through a curved slot 97 of the plate 69, a springy disk 98 being secured to the lower end of said stud and engaging the bottom face of the plate 69 to give support to said plate. A finger 99 secured to the plate 69 extends up through a curved slot 100 of the table 20 to a position convenient to the operator, thus providing simple means for manual setting of the plate 69 to any of its intended control positions.

The plate 69 also carries a finger or extension 101 which has its extreme portion adjacent to the clutch bell-crank 81; and said extreme portion is provided with the depending and cam shaped flange 102. The free arm of the clutch bell-crank 81 is provided with a pin 103 which projects up to a position where it may be engaged by the flange 102 when the plate 69 is rocked to its extreme position in the clockwise direction. In other words, when the plate 69 is rocked to bring its slanting edge portion 93 against the roller 92, said flange 102 will engage the pin 103 to rock the clutch bell-crank and release the pin 83 from the shoulder, thereby instituting a cycle of cam operation, irrespective of the functioning of the tone-arm and lever 86.

The bell-crank 73 is provided with a shoulder 104, and the finger 101 carries a pin 105 which may engage said shoulder 104, when the plate 69 stands in certain of its intended positions. This shoulder 104 is preferably formed on a circular arc having its center at the point 106, slightly to the side of the axis 70 on which the plate 69 rocks. It will be seen that when the control plate 69 stands in any position where the pin 105 overlies the shoulder 104, the bell-crank 73 is held against rocking counterclockwise sufficiently to engage the wheel 77 with the wheel 63. Such result is secured for the "Off" position shown in Figs. 2 and 3, and for the "Manual" position which will be attained by rocking the plate 69 to bring the notch 90 to the roller 92. So for either of these positions the driving of the cam element 40 will not occur.

Upon rocking the control plate 69 to bring the notch 91 into engagement with the roller, or upon further manually retained rocking of said plate to hold the slanting portion 93 against the roller, the shoulder 104 is free of the pin 105, allowing normal cyclic operations of the cam element to occur.

I shall now describe the means for supporting and feeding the records successively into playing position on the turntable. The centering pin 107 is set into a suitable socket co-axial with the turntable itself. This centering pin is shown in detail in Figs. 13, 14, 15 and 16. As shown, this centering pin is straight and of size to pass easily through the center openings of the records. At one side, the pin is provided with an inwardly reaching notch 108 having at its lower end the shoulder 109 formed normal to the axis of the pin. The upper portion of this notch 110 is curved outwardly; but just above the shoulder 109 this notch is straight for an elevation substantially equal to a record thickness, as shown at 111. The inner wall of this notch 108 is rounded as well shown by the horizontal section of Fig. 16.

The lowermost record of a stack of records rests on this shoulder 109, the records themselves extending sidewise from the centering pin towards the left in Fig. 13.

At the opposite side, the centering pin is provided with another notch 112. This notch is of greater vertical extent than the notch 108, the upper portion of the notch 112 overlapping the lower straight portion of the notch 108, and having the curved upper end 113. The lower portion 114 of this notch 112 is also curved, and the inner face of this notch 112 is curved as shown by the horizontal sections in Figs. 15 and 16; but this inner face is straight between the upper and lower curved portions, as shown at 115. It is noted that there is thus provided an overlapping vertical portion of the notch 108 and the notch 112, equal in vertical dimension substantially to the thickness of a record. Thus by a slight lateral shifting of the lowermost record of the stack it can be released from the shoulder 109 to descend onto the turntable or the top record of a pile accumulated on the turntable.

It is here noted that the notch 112 of the centering pin has its upper end portion 113 located at such elevation that only the lowermost record of the pile, namely that one resting on the shoulder 109, can shift towards the right in Fig. 13, thus ensuring that only such lowermost record will be released.

The record shifting unit is shown in Figs. 3 and 6 to 12 inclusive, in detail, and the relation of said unit to the record and the centering pin is well shown in Fig. 1. This unit includes the post element 116 comprising the companion sheet metal sections 117 and 118. These latter are so formed that when they are set together, as shown in Figs. 8 and 9, their upper and lower edges will come together to provide the top and bottom portions of the post, but the central portions 119 and 120 do not come directly into contact but are separated sufficiently to receive the rockable lever 121 between them. A rivet 122 is then passed through these central portions, and through the lever 121, so that said rivet serves not only to retain the parts 117 and 118 in proper relationship, but also provides the pivot for the lever 121. It is here to be noted that the upper and lower end portions of the sheet metal plates 117 and 118 are companionly notched so that when said plates are thus set together these notches provide slots for passing the lever 121, so that said lever may properly project above the post as shown at 123, and below the post as shown at 124. These slots are also of size to permit the desired amount of lever rocking to be performed.

The lower end of this post is secured to the table 20 as by riveting; and this post is preferably located in one corner of the table so that sufficient space is provided for its accommodation without having to increase the size of the table in overall dimensions. Also, the notches 108 and 112 of the centering pin, while being located diametrically opposite to each other, are also located in a plane passing through the centering pin and through the post 116. Such fact is apparent from examination of Fig. 1.

Secured to the top of this post 116 is the plate 125; and said plate is formed to provide the two arms 126 and 127 which project outwardly from the post sufficiently to provide the two record edge supports 128 and 129 in the form of small round extensions. The edge of this plate between said round extensions is formed on the arc of a circle drawn about the centering post as a center, or about a center slightly closer to the post 116 than said centering post.

Slidably mounted on the plate 125 is the record feeder 130, in the form of a bar extending in a generally radial direction with respect to the turntable. This bar is held in place by the four rivets or studs 131 whose heads reach over the edge portions of the bar sufficiently to hold the bar in place without, however, interfering with free sliding movement of the bar radially. This feeder is provided with a slot of size to easily pass the upper projecting portion of the lever 123, so that rocking of said lever is translated into back and forth movements of the feeder bar. Normally the lever is held in such position that the inner end of the feeder bar stands just beyond the edge of the record at the bottom of the pile, with the edge portion of said record supported by the portions 128 and 129; but rocking of the lever to carry the feeder bar slightly inwards radially will shift such bottom record towards the centering pin sufficiently to effect release of said edge portion from the supports 128 and 129, to allow the record to descend onto the turntable or to the top of the pile of records thereon. It is noted that as these records stand on the post element 116 they are slightly eccentric with respect to the centering pin, and that such shift effected by the feeder bar 130 serves to move the lowermost record into concentric relation to the centering pin, to thereby permit such record to descend.

Referring again to Figs. 13, 14, 15 and 16, showing the details of the centering pin, there is seen the finger 132 rockingly mounted in a slot 133 of the upper portion of the centering pin, the pivot 134 being provided for this purpose. This slot is conveniently formed by a milling operation with the milling cutter centered at the point 135, so that the inner edge of this slot is arcuate as shown at 136. Furthermore, the inner edge of the finger itself is curved so that said finger normally rests against this curved portion 136, the lower portion of the finger projecting outside the confines of the centering pin towards the record supporting post 116, as evident from Figs. 1 and 13. Such being the case, as the records are set down onto the centering post with their center holes receiving the centering post and registering thereon, the lowermost record may be brought to position where it will rest on the shoulder 109, being moved slightly eccentrically by the operator to secure this result; but the next higher record will be automatically forced sidewise by the lower portion of the finger 132, so that said record will be moved into such eccentric position, and and will be retained in such eccentric position against lateral movement, even when the lowermost record is shifted laterally by the feeding movement of the feeder bar 130. Thus there is assurance that only the lowermost record of the pile will be fed down onto the turntable or to the pile thereon.

It will be noted that the form of this finger 132 is such that said finger may be raised about the pivot 134 into a position where said finger is completely received within the confines of the slot 136 of the centering pin. Also, that the lower edge portion of this finger is so formed that when said finger stands in its fully lowered position, as shown in Fig. 13, any upward pressure which may be exerted against said lower portion by lifting the record will tend to rock said finger about its pivot 134, thus moving the finger up into the slot and within the confines of the centering pin proper. Therefore, by merely raising the record, the finger will be rocked up and out of the way to permit the record to be withdrawn from the centering pin, and without need of removing the centering pin from its socket whereby it is normally supported. In connection with the foregoing relationship, it is noted that the point of engagement of the record surface with the lower edge portion of the finger always lies to the left of the axis of the centering pin, and to the left of the projected line passing through the pivot 134, so that such upward movement of the record is always accompanied by a turning movement tending to rock the finger upwards in the manner previously explained.

It will now be apparent that normally the records occupy the slightly eccentric position shown in plan in Fig. 1 (eccentric with respect to the turntable), and that a slight shift of the lowermost record of the pile serves to release the same to cause it to descend to the turntable or pile thereon. Sometimes it will be desirable to provide a rockable finger or plate 137 (Fig. 4) having the end portion 138 resting on the face of the uppermost record of such pile of unreleased records. In such case this plate may be provided with the lugs 139 which set down into suitable vertical slots 140 in the wings 141 of the plate 125, a spring being provided if desired to draw this plate down to exert a suitable pressure of the end 138 against the top record face. This end 138 may be in the form of a ball of rubber or other resilient material.

The rocking of the lever 121 to control the feeding of records to the turntable is effected in the following manner:

Pivoted to the bottom face of the table 20 is the bell-crank 142, the pivot thereof being shown at 143. One end 144 of this bell-crank is bent around to provide a finger which lies to the outside of the lower end 124 of the rock lever, so that rock of said bell-crank clockwise in Fig. 3 serves to release the rock lever for feeding movement, whereas counterclockwise rocking of said bell-crank serves to rock the lever back to draw the feeder plate 130 outwardly radially and permit a new record to be edge engaged by said feeder plate for the next operation. A spring 145 tends at all times to retain the lever end 124 in engagment with said finger 144, and said spring is strong enough to ensure rocking of the lever 121 for record feeding operations when the bell-crank is released or rocked clockwise; but it will be seen that in case the lever should be blocked against rocking movement, said spring 145 may be extended when the bell-crank is rocked, and thus record feeding will not occur even when the bell-crank is thus rocked.

The cam element 40 carries a pin 146 which extends up far enough to engage the longer arm 147 of this bell-crank at the proper time in the cycle of operation of the cam element, thus rocking the bell-crank at such time, to normally effect record feed. A spring 148 normally holds the bell-crank back against a stop pin 149 carried by the table 20, although such pin is not always required as the return rocking of the bell-crank is normally stopped by limitation of the rocking of the lever 121. It is noted that the bell-crank is so formed as to bring said arm 147 down relatively close to the upper face of the cam element 40, so that the pin 146 does not need to project far above said upper face to perform its functions. It is also noted that the end portion of this arm 147, 150 is formed on a special curve so that as the pin 146 passes said end portion, the lever is first rocked to release the record, and thereafter the lever is permitted to return to its normal position under controlled movement, so as to avoid jars or impacts in the movements of the several parts, and to restore the feeder plate 130 easily to its outermost position and allow the next record to move down into position ready for the next feeding operation.

It was mentioned that it is possible to prevent record feeding to occur even when the bell-crank 142 is rocked, by blocking the lever 121 against movement. Means to effect this result will now be described:

The lever 121 is provided with a rectangular opening 151 below the pivotal point of said lever; and a plate 152 is extended through said opening, being journalled in the plates 117 and 118 of the post 116. Such journalling is readily effected by provision of round holes in said plates 117 and 118 of appropriate size. The end portion 153 of this plate 152 is formed to provide the handle for convenient rotation of the plate 152 to set it in either of two positions, either with the plate 152 vertical as shown in Figs. 9 and 12, or with said plate horizontal. In the vertical position illustrated there is sufficient clearance between the plate and the side walls of the opening 151 to permit the required amount of rocking movement of the lever 121 to occur for record feed whereas by turning the plate ninety degrees so that it stands in horizontal position it will block such rocking movement of the lever and prevent record feed from occurring even when the bell-crank 142 is rocked. In such case, rocking of the bell-crank will be accompanied by extension of the spring 145, but without record feed. It is also noted that said spring ensures proper operation of the respective parts to effect record feed or otherwise without the need of producing the various parts to a high degee of tolerance accuracy in manufacturing operations.

I have shown the elliptical housing for the post 116 in Figs. 1, 4, 5, 6, 7, 10 and 11, comprising an elliptical cylinder 154 set down over the body portion of this post.

It is noted that the elevations of the notch 108 and the shoulder 109 of the centering pin, and of the record edge supporting fingers 128 and 129, are substantially equal, so that the records lie substantially horizontal when supported by these parts. Such record supporting plane is shown by the broken lines 155 in Figs. 4 and 5.

It is to be noted that if desired record release may be manually effected by forcing the upper portion 123 of the lever 121 inwardly (towards the centering pin) with sufficient force to overcome the force of the spring 145. Such action may be effected as an emergency operation when the tone arm has been raised and swung outwardly beyond the outer edge of the record previously in playing position.

While I have herein shown and described only a single embodiment of the features of my present invention, still I do not intend to limit myself thereto, except as I may do so in the claims to follow.

I claim:

1. In a record changing phonograph, a turntable, a centering pin extending upwardly from said turntable provided with means defining a notch on one side thereof including a shoulder at the lower end of said notch to support a record eccentrically on said centering pin above said turntable, means for shifting said record laterally to bring it into concentricity with said centering pin and to release said record from said shoulder so it may fall onto said turntable comprising a vertical post adjacent said turntable and positioned radially opposite said notch relative to said turntable, means on the upper portion of said post to support the peripheral edge portion of said record when said record is eccentrically mounted on said centering pin and supported on said shoulder, said last-mentioned means being of such a size and positioned so as to be free of said record when said record is shifted laterally so as to be concentric with said centering pin, a feeder plate radially reciprocal relative to said turntable for engaging the peripheral edge of said record and movable in a direction to release said record from said shoulder positioned at the upper portion of said post, movable means associated with said feeder plate for postively moving said feeder plate radially outward from said centering pin, yieldable means tending to move said feeder plate in the other direction, means including an intermittently driven element in the phonograph for effecting movement of said movable means during a record changing cycle of said phonograph, and manually operable means for blocking movement of said feeder plate radially inward toward said centering pin regardless of the movement of said movable means.

2. In a record changing phonograph, a turntable, a centering pin extending upwardly from said turntable provided with means defining a notch on one side thereof including a shoulder at the lower end of said notch to support a record eccentrically on said centering pin above said turntable, means for shifting said record laterally to bring it into concentricity with said centering pin and to release said record from said shoulder so it may fall onto said turntable comprising a vertical post adjacent said turntable and positioned radially opposite said notch relative to said turntable, means on the upper portion of said post to support the peripheral edge portion of said record when said record is eccentrically mounted on said centering pin and supported on said shoulder, said last-mentioned means being of such a size and positioned so as to be free of said record when said record is shifted laterally so as to be concentric with said centering pin, a feeder plate radially reciprocal relative to said turntable for engaging the peripheral edge of said record and movable in a direction to release said record from said shoulder positioned at the upper portion of said post, movable means associated with said feeder plate for positively moving said feeder plate radially outward from said centering pin, yieldable means tending to move said feeder plate in the other direction, means including an intermittently driven element in the phonograph for effecting movement of said movable means during a record changing cycle of said phonograph, and manually operable means to block the movement of said feeder plate radially inward toward said centering pin during movement of said movable means comprising a stop movable into blocking position with respect to said movable means.

3. In a record changing phonograph, a turntable, a centering pin extending upwardly from said turntable provided with means defining a notch on one side thereof including a shoulder at the lower end of said notch to support a record eccentrically on said centering pin above said turntable, means for shifting said record laterally to bring it into concentricity with said centering pin and to release said record from said shoulder so it may fall onto said turntable comprising a vertical post adjacent said turntable and positioned radially opposite said notch relative to said turntable, means on the upper portion of said post to support the peripheral edge portion of said record when said record is eccentrically mounted on said centering pin and supported on said shoulder, said last-mentioned means being of such a size and positioned so as to be free of said record when said record is shifted laterally so as to be concentric with said centering pin, a radially reciprocal means relative to said turntable for engaging the peripheral edge of said record and movable in a direction to release said record from said shoulder positioned at the upper portion of said post, a lever pivoted to said post about a transverse axis and having one end thereof engageable with said reciprocal means, rocking means for positively engaging said lever and rocking it in a direction to shift said reciprocal means radially outward with respect to said centering pin, spring means tending to move said reciprocal means radially inward for record feeding purposes, means including an intermittently driven element in the phonograph for positively rocking said rocking means in one direction, spring means for rocking said rocking means in the other direction, and manually operable means extending through said lever and rotatable to a position to positively block movement of said lever by said rocking means in a direction to move said reciprocal means radially inward toward said centering pin.

SVEN A. STOLBERG.

REFERENCES CITED

The following references are of record in the file of this patent:

UNITED STATES PATENTS

| Number | Name | Date |
|---|---|---|
| 1,938,810 | Collison et al. | Dec. 12, 1933 |
| 2,063,199 | Slater | Dec. 8, 1936 |
| 2,270,995 | Compare | Jan. 27, 1942 |
| 2,300,668 | Habegger | Nov. 3, 1942 |
| 2,323,472 | Johnson et al. | July 6, 1943 |
| 2,328,641 | Glaser | Sept. 7, 1943 |
| 2,374,080 | Dale | Apr. 17, 1945 |